United States Patent
Becker et al.

(10) Patent No.: US 6,782,085 B1
(45) Date of Patent: Aug. 24, 2004

(54) METHOD FOR MAPPING CALL DETAIL DATA INTO A DATABASE FOR QUICK RETRIEVAL

(75) Inventors: Richard A. Becker, Morristown, NJ (US); Allan R. Wilks, Scotch Plains, NJ (US)

(73) Assignee: AT&T Corp., New York, NY (US)

( * ) Notice: Subject to any disclaimer, the term of this patent is extended or adjusted under 35 U.S.C. 154(b) by 308 days.

(21) Appl. No.: 09/812,195

(22) Filed: Mar. 19, 2001

Related U.S. Application Data

(60) Provisional application No. 60/260,029, filed on Jan. 5, 2001.

(51) Int. Cl.[7] .............................................. H04M 15/00
(52) U.S. Cl. ........................................ 379/126; 379/111
(58) Field of Search ........................... 379/111, 112.01, 379/114.03, 126, 133, 143, 114.01; 707/3, 4, 5, 100, 102

(56) References Cited

U.S. PATENT DOCUMENTS

| | | | |
|---|---|---|---|
| 5,333,183 A | | 7/1994 | Herbert |
| 5,757,900 A | * | 5/1998 | Nagel et al. ............ 379/221.09 |
| 5,907,603 A | * | 5/1999 | Gallagher et al. .......... 379/133 |
| 6,385,301 B1 | * | 5/2002 | Nolting et al. ........... 379/32.01 |

* cited by examiner

Primary Examiner—Curtis Kuntz
Assistant Examiner—Barry W Taylor

(57) ABSTRACT

The present invention relates to fast data retrieval. The present invention discloses storing call detail data into two databases. A portion of the total call detail data available is mapped into an interpreted usage event (IUE) and stored in a first database that is indexed for quick data retrieval utilizing a standard database management system. The total raw call detail data is stored in a second database that is less structured, with respect to the first database, without requiring explicit indices. IUEs are retrieved from the first database in response to queries specifying one or more of the characteristics of the desired IUEs. Call detail data stored in the second database is retrieved in response to queries specifying the characteristics from one or more of the retrieved IUEs.

21 Claims, 2 Drawing Sheets

METHOD FOR MAPPING CALL DETAIL DATA INTO A DATABASE FOR QUICK RETRIEVAL

CROSS-REFERENCES TO RELATED APPLICATIONS

This application claims priority to Provisional Application Serial No. 60/260,029 filed on Jan. 5, 2001 in accordance with 35 U.S.C. §119.

FIELD OF THE INVENTION

This invention relates generally to fast data retrieval. More particularly, this invention relates to mapping call detail data provided in an unstructured or difficult-to-search form into at least two databases. A portion of the total data available is stored in a first database that is indexed for quick data retrieval. The total data is stored in a second database that is distinct from the first database, in that the second database does not require explicit indices.

BACKGROUND OF THE INVENTION

Immediate access to data is increasingly more important and complex. For example, consumers are demanding immediate information about their accounts with companies. In addition, companies are demanding more specific information about consumers to classify the consumers and target information to them, to discover consumer trends, to detect consumer fraud, etc. Thus, it is becoming more important to have methods and apparatus for retrieving specific data quickly.

Raw data is often difficult to retrieve in a quick manner, especially when the raw data is large. In some cases, it is important to have quick access to only a portion of the total raw data, for example, that portion of the total raw data that may be more relevant for a particular purpose. In other cases, it is useful to retrieve the total raw data. The raw data as it is used herein is intended to include all types of data including, without limitation, text, alphanumeric characters, photographs, pictures, other graphics, audio and/or visual data that is collected in an unstructured form, an unindexed form, a difficult-to-search form, bulky form, a form not easily integrated into a standard database management system, or the like.

An example of raw data is Automated Message Accounting (AMA) data, which is often used by telecommunications companies. AMA data includes a variety of call usage information, including, for example, originating number, terminating number, connect date and time, elapsed time of call, etc. The AMA data also includes additional data fields that further describe the call, such as the trunks used, various status indications about the call, the operator used, and the carriers used (for example, wireless carriers, local exchange carriers, and long distance carriers). AMA data comes in a variety of different formats, i.e., having different structure codes, often with appended modules that include additional information.

For more detailed information about AMA data, see *Billing Automated Message Accounting Format (BAF) Generic Requirements*, Document No. GR-1100, Issue No. 04, Issue Date December 1999; and *Generic Requirements for Exchange Access Automatic Message Accounting (AMA)*, FSD 20-25-0000, Document No. GR-1083, Issue No. 03, Issue Date November 2000, both available from Telcordia Technologies.

Given the large number of telephone calls made, and the large amount of data associated with each call, the total raw data can be quite voluminous. With the AMA data being so large, it is expensive or inefficient to store all the AMA data in such a manner as to provide for quick retrieval.

In some cases, only a portion of the total AMA data is important to a customer, company, analyst, etc. For example, some data is important for billing, determining user fraud, detecting calling patterns, and predicting future use, but not other data. However, it is sometimes necessary to retrieve all of the AMA data, for example, to resolve problems in the network. Thus, there is a need to quickly retrieve a portion of each AMA data record and also a need to retrieve the associated complete AMA data record.

BRIEF SUMMARY OF THE INVENTION

The present invention overcomes the above and other problems by disclosing a cost-effective and versatile solution for the storage and quick retrieval of a portion of the total raw data as well as the storage and retrieval of the total raw data. The present invention enables the raw data to be stored in a highly compressed form, thus reducing the memory space needed to store raw data. In addition, in one implementation, the invention discloses a system and method of retrieving data in seconds, even for large amounts of data.

More specifically, the present invention discloses a method of storing and quickly retrieving call detail data. The method comprises mapping a portion of the call detail data into an interpreted usage event (IUE), wherein the IUE includes a fixed number of fields, each field having a fixed format. At least some of the fields store characteristics of the call detail data. The method further comprises storing the IUE in a first database and storing the original call detail data in a record in a second database. The IUE in the first database corresponds to the record in the second database. The method further comprises querying the first database with a first query to identify the IUE with one or more of the characteristics of the call detail data, and retrieving from the first database the IUE responsive to the first query. The retrieving of the IUE is executed in a quick manner based on characteristics of the first database. For example, one or more of the fields may be indexed to enable quick IUE retrieval.

The method further comprises querying the second database with a second query by entering characteristics from the retrieved IUE, and retrieving the record from the second database responsive to the second query. The retrieving of the IUE from the first database is executed more quickly than the retrieving of the record from the second database based on the characteristics of the first database in comparison to characteristics of the second database.

BRIEF DESCRIPTION OF THE DRAWINGS

The present invention will be more fully understood by reading the following detailed description in conjunction with the drawing, in which.

DETAILED DESCRIPTION OF THE INVENTION

Although embodiments of the present invention are illustrated in the accompanying Figures and are described in this Detailed Description, it is understood that the present invention is not limited to these embodiments, but is capable of numerous arrangements, modifications, and substitutions without departing from the spirit or scope of the invention as defined in the claims. Various modifications and adaptations of the present invention will be apparent to persons skilled in the art. For example, the present invention is often described below with reference to AMA data used by telecommunications companies; however, the present invention is not intended to be so limited. Applicants intend for this invention to be applicable to any type of data gathering system, regardless of the subject matter or form of the data.

Figure 1:
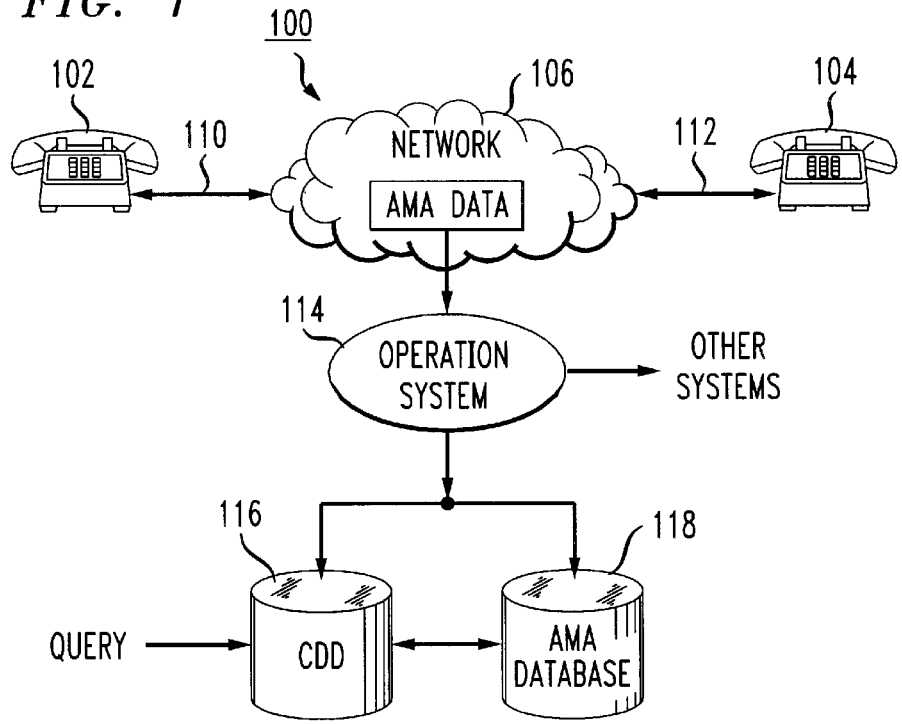
FIG. 1 is a block diagram illustrating a telecommunications system in which the present invention may be implemented.

FIG. 1 illustrates a block diagram of telecommunications system 100 in accordance with an embodiment of the present invention. System 100 includes originating phone 102, destination phone 104, network 106, transmission lines 110 and 112, operation system 114, Call Detail Database (CDD) 116 and AMA database 118. Originating phone 102 and destination phone 104 are connected to network 106 via transmission lines 110 and 112 respectively. FIG. 1 displays phones 102, 104 as plain old telephones, but phones 102, 104 could alternatively be cordless or wireless phones or any type of suitable telecommunication device. Lines 110, 112 may be wired or wireless of any suitable transmission media.

Network 106 includes AMA data 108. AMA data 108 is call detail data. Call detail is an industry standard way of describing a call, generally information for billing and other purposes. As described above, AMA data 108 includes a variety of call information, including, for example, originating number, terminating number, connect date and time, elapsed time of call, etc. AMA data 108 also includes additional data that further describes the call, such as the trunks used, various status indications about the call, the operator used, and the carriers used (for example, wireless carriers, local exchange carriers, and long distance carriers). AMA data comes in a variety of different formats, i.e., having different structure codes, often with appended modules that include additional information. Modules may include information about an operator, if one was used, information about local network portability or information about call features, such as caller identification.

When a call is placed from originating phone 102 to destination phone 104, through a switch (not shown) in network 106, the switch generates AMA data 108 upon call completion. AMA data 108 is routed from network 106 via operation system 114 that primarily operates to provide AMA data 108 from network 106 to various systems, most notably billing, that use AMA data 108. AMA data 108 is transmitted from operation system 114 to CDD 116 and to AMA database 118. AMA data 108 may be routed from network 106 and from operation system 114 via any number of suitable transmission protocols and media. For example, suitable protocols include File Transfer Protocol and Transmission Control Protocol/Internet Protocol and suitable transmission media include twisted shielded pair wire, fiber optic cable, coaxial cable and wireless links, although others may be used.

In a typical day, hundreds of millions of calls are completed and hundreds of millions of AMA records are processed. AMA data 108 that is associated with a call is sometimes referred to herein as an AMA record. On average, an AMA record is approximately 160 bytes, depending upon the number of modules appended. The complexity of the structure of the AMA records, as well as the large amount of call detail data provided in each record, makes the records expensive to store in a form that enables quick retrieval.

Thus, in accordance with an exemplary embodiment of the present invention, to provide for quick retrieval of AMA data 108, AMA data 108 from operations system 114 is stored in a first database, namely CDD 116, and also stored in second database, namely, AMA database 118, as follows.

AMA data 108 is converted, extracted, copied or mapped from its existing structure, having its structure code, modules etc., into a flat file, e.g., a set of structured records, each having a fixed number of fixed format fields. The more common or generally useful information included within each AMA data record is mapped to produce an interpreted usage event (IUE), or CDD record, which is stored in CDD 116. Each IUE includes a fixed number of fields, for example, twenty to fifty fields, that include a portion of the total AMA data available in each AMA record. These fields are each defined by a fixed format. These fields store characteristics about the call such as the call originating number, originating switch, terminating number, call connect date and time, elapsed time of call, etc.

The IUEs of CDD 116 are indexed and retrieved by known existing technology of a database management system (DBMS). The DBMS chosen should accommodate the size of data to be stored. Many commercial DBMSs exist, for example, those sold by ORACLE®, which could be used depending on a user's application.

In one embodiment, CDD 116 is arranged according to a DAYTONA ® DBMS designed to accommodate the large volume of daily data and structured in a flat file to store multiple records. (Information about the DAYTONA ® DBMS can be found at www.gtlinc.com/daytona.html.) Each IUE contains thirty-nine fields and is approximately 160 bytes in length in a first form. To reduce the storage requirements, the IUEs may be converted into a second form, via encoding or other ways known in the art, and compressed into a smaller length, e.g., thirty bytes, before being stored in CDD 116.

The IUEs are stored in CDD 116 with many of the fields indexed. The indexing enables the quick retrieval of the IUEs, however, other methods of quick retrieval now known or later discovered could be used. Such indexed fields might include originating number, date, and terminating number. Thus, if a user desires to retrieve calls placed from an originating number on a particular date, the user enters the originating number and date as a query (see FIG. 1) and the DBMS searches CDD 116 for IUEs having the desired characteristics. Once these IUEs are located, the IUEs are retrieved and displayed for the user. The indices stored in CDD 116 allow certain fields to be searched instead of sequentially reading all the records, therefore reducing the total search time from many hours to a few seconds.

The user can input a query such that CDD 116 returns one or more IUEs. For example, a user might input a query having call characteristics including the originating call number, month, day, year, and hour for a residential originating number. This query most likely would yield zero, one or a few IUEs. Alternatively, a user might input a query having the originating call number, month, and year for a business originating number. In this case, the query most likely would reveal a large number of IUEs.

CDD 116 can have an extremely large capacity. For example, approximately 350 million AMA records may be received each day. Roughly the same number of IUEs are created each day. CDD 116 may store any amount of IUEs in its indexed database. For example, current CDD 116 stores six months of IUEs with plans to increase CDD 116 to store two years of IUEs. Notwithstanding this large size of CDD 116, responses to typical queries for IUEs from CDD 116 can be retrieved in under a minute.

When an IUE is retrieved in response to a query, the IUE is often a sufficient description of the call in question. However, in the event that more data is required, it is necessary to retrieve the AMA record that corresponds to the IUE. For example, the information in AMA database 118 can help one troubleshoot problems better than the information in the CDD 116, because AMA database 118 contains more information than CDD 116. AMA database 118 contains more helpful information to solve network problems, incorrect settings, incorrect switching operations, billing problems, etc. Thus, it is sometimes desirable to obtain the AMA record that corresponds to the CDD record.

AMA records received from operation system 114 are also extracted, copied, mapped or stored in AMA database 118. AMA database 118 may be compressed for more efficient storage. The compression may be at the file level, the record level or in any suitable manner. AMA database 118 stores AMA data records within files that are a standard part of a computer's file system. The files have a naming convention based upon the originating switch, the day and the hour that the AMA record is processed. Alternate storage structures and naming conventions may be implemented as is known to one of ordinary skill in the art. In general, an AMA record for a call is processed shortly after the call is completed. The day and hour of the call completion, therefore, is approximately equal to the day and hour that the call is processed.

AMA database 118 is more simplistic in comparison to CDD 116 in that it does not require explicit indices to readily pin-point individual AMA data records of interest. If one desires to find an AMA record in AMA database 118, one can approximately identify the file containing a desired record by entering a query based upon the originating switch, the date and the hour of the call completion. (Recall that the date and hour of the call completion are often close to the date and hour that the call is processed by AMA database 118.) The query will retrieve a file, uncompress the file, if compressed, and search the file sequentially for a specific AMA record. If the record is not located, the next sequential files will then be searched until the specific AMA record is located and retrieved.

Records in CDD 116 contain information to access the appropriate file in AMA database 118. Specifically, each IUE in CDD 116 includes the originating switch, the call date, the start time and the elapsed time of the call. When a CDD query is issued to CDD 116 and an IUE is retrieved in response to the CDD query, there is information in the IUE sufficient to access the corresponding file in AMA database 118. The originating switch and the call date are fields in the IUE of CDD 116. The disconnect time can be calculated knowing the start time and the elapsed time of the call. These three values, the originating switch, the date and the hour of disconnect time, are combined to yield a file name that approximately corresponds to the file in AMA database 118 which contains more information about the call of interest. An AMA query with this information is sent to AMA database 118. Once the file in AMA database 118 is retrieved, the file is decompressed as necessary and searched to identify the specific AMA record of interest by identifying the AMA record with the corresponding originating number, originating switch, terminating number, connect time, etc.

Figure 2:
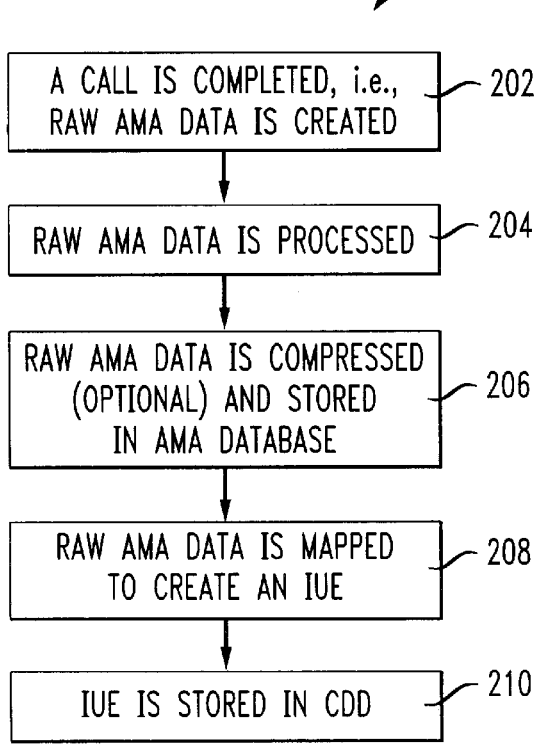
FIG. 2 is a flow chart illustrating the storage of data in accordance with an exemplary embodiment of the present invention.

FIG. 2 illustrates a flow chart 200 in accordance with the present invention showing the storage of data. FIG. 2 is explained with reference to a hypothetical example. Two telephone calls are made from residential number 123-456-7890, using originating switch 012345, on Jan. 02, 2001 between the hours of 09:00 a.m. and 10:00 a.m. Upon the completion of each call, raw AMA data 108 is created. (Step 202). The raw AMA data is then processed (Step 204) and stored into AMA database 118. (Step 206). The raw AMA data may be compressed using any known compression methods prior to storage. The raw AMA data may be compressed at the file level, at the record level or at some appropriate level within a particular data storage arrangement. The raw AMA data is also mapped to create records, namely IUEs or CDD records. (Step 208). The IUEs are stored into CDD 116. (Step 210).

Figure 3:
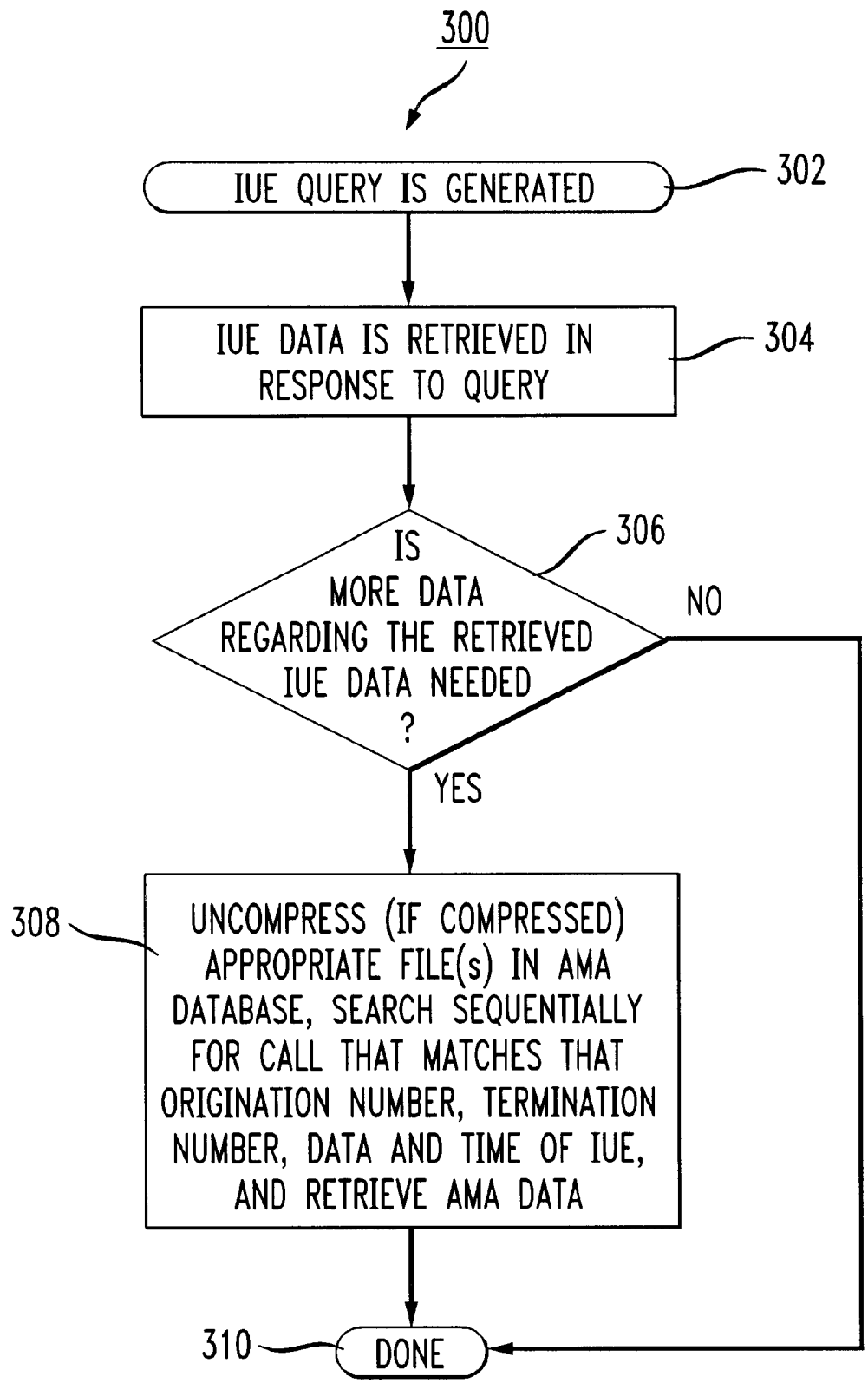
FIG. 3 is a flow chart illustrating the retrieval of data in accordance with an exemplary embodiment of the present invention.

A user desires to retrieve information about these two calls as shown in FIG. 3. A CDD query is run using a DBMS in CDD 116 to retrieve all IUEs regarding residential number 123-456-7890, using originating switch 012345, on Jan. 02, 2001 between the hours of 09:00 a.m. and 10:00 a.m. (Step 302). Two IUEs are retrieved, a first call being made at 09:05 a.m. and lasting ten minutes and a second call being made at 09:45 a.m. and lasting twenty minutes. (Step 304).

More information is desired about these two IUEs, for example, what trunks were used and whether operators assisted in the calls. (Question 306). (If more information is not desired, the process would be done, as indicated by the "No" option and Step 310). To retrieve the corresponding AMA records for each IUE, a second query is run in AMA database 118. (Step 308). The files of AMA database 118 are uncompressed, if applicable, and searched until the AMA records, corresponding to the IUEs, are identified and retrieved.

As noted above, AMA records may be stored in files indexed by the originating switch, and the date and hour that the call is processed. In this example, the call completion hour would be "09" for the first call and "10" for the second call. Assuming that the completed call is processed at approximately the same time that the call was completed, i.e., within one or two hours, the AMA query will start searching AMA database 118 at the files indexed by date, switch, and hour. For example, when storing data in a file system, the "date" can be used as a file directory and the "switch hour" information can be used as a file name. This convention reduces the number of files stored in a single directory. In this example, AMA database 118 would start searching in file directory Jan. 02, 2001 at file 012345.09 for the first call and in file directory Jan. 02, 2001 at file 012345.10 for the second call. These files in AMA database 118, as well as the subsequent files, are then uncompressed, if applicable, and searched until the two AMA records, corresponding to the two IUEs, are identified and retrieved. (Step 308).

If the second call made at 09:45 a.m. lasted only ten minutes, instead of the twenty minutes, the completion time of the call would be 09:55 a.m. Depending upon the transmission time of the AMA data from the switch to processing, the second call could be processed in hour 9 or hour 10. Because the processing time is not definite, a range of AMA files in AMA database 118 needs to be searched to retrieve the appropriate data.

In an alternate embodiment, the IUEs of CDD 116 include a field that allows one to more quickly locate the corresponding data in AMA database 118. Specifically, this field includes information regarding the relationship between the time the call was completed and the time the completed call was processed in AMA database 118. As discussed above, AMA data 108 is generally stored in a file in AMA database 118 within the hour or so that the call was completed. So, the actual call date and call completion time generally reflect the date and time that the call was processed and stored in AMA database 118. In certain cases, however, the AMA data may not be stored in AMA database 118 for over a week. When this happens, part of the file index or file identifier, i.e., the date and hour that the call is processed, does not approximate the actual call date and actual call termination hour. In this alternate embodiment, the IUE or CDD record, includes an additional field that reflects whether or not the AMA file was delayed in being stored. This field reflects the additional time, in hours, for example, that elapsed between the call completion and call processing. To locate a file in AMA database 118 that corresponds to an IUE in CDD 116 in this embodiment, the call elapsed time and the additional time prior to call process is added to the call initiation time to identify the correct index of the file with which to begin searching.

AMA database 118 may be interfaced with CDD 116 in any number of ways known to those of ordinary skill in the art. For example, the interface between AMA database 118 and CCD 116 may be a web-based interface such that a user can "point-and-click" on an IUE and the corresponding AMA record will be retrieved for the user. Alternatively, the interface is designed such that a user selects, highlights or checks-off one or more IUEs and "points-and-clicks" on an AMA icon to retrieve the corresponding AMA data records. In yet another alternate embodiment, the retrieved IUEs are displayed on a screen having an icon or "hot button" that retrieves the raw AMA data from AMA database 118 for all the retrieved IUEs using a one-step process by "clicking on" or depressing the icon or "hot button."

Alternatively, a web-based interface may be used to directly access the raw AMA data. If the call disconnect date and time information is known, as well as some characteristics of the call, e.g., the originating number, terminating number, etc., the raw AMA data may be obtained directly without requiring the access to CDD 116.

As noted above, IUEs from CDD 116 can be retrieved often times in under a minute. With the teachings of the present invention, AMA records from AMA database 118 can also be retrieved within a minute.

Although the present invention is illustrated with respect to AMA data, it is understood that the present invention is not limited to these embodiments, but is capable of numerous arrangements, modifications, and substitutions without departing from the spirit or scope of the invention as defined in the claims. Applicants intend for this invention to be applicable to any type of data gathering system, regardless of the subject matter or form of the data. For example, it is contemplated that, instead of AMA records, a user may wish to store pictures, photographs or other types of graphical files. To index the pictures, a user might identify the pictures by feature sets, for example, predominant color, subject matter, brightness, or other characteristics. In this example, the pictures are the unstructured, difficult-to-search data that would be stored in database 118. The feature set would be indexed and stored in database 116. In yet another embodiment, instead of AMA records, a user may wish to store documents. A user would compute a feature set of the document, for example, frequently commonly used words in the document, subject, author, etc. In this example, the documents are the unstructured data that would be stored in database 118. The feature set would be indexed and stored in database 116. Numerous other applications are possible, as would be obvious to one of ordinary skill in the art.

What is claimed is:

1. A database system comprising
  a) a first database and second database, wherein the second database contains records each containing call detail data for a respective call, different ones of the records in the second database having differing numbers of fields and having differing field formats, and wherein the first database contains records each corresponding to a different one of the records in the second database, the records in the first database having a consistent format, each record in the first database containing at least a portion of the call detail data of the corresponding record in the second database and at least ones of the records in the first database containing only a portion of the call detail data of the corresponding records in the second database,
  b) a database management system arranged to index at least one of the fields of the records in the first database and for utilizing the resulting indexing to retrieve records from the first database in response to queries, and
  c) means operative in response to retrieval of a record from the first database for retrieving the corresponding record in the second database utilizing at least one piece of call detail data contained in the retrieved record to identify a location in the second database at which the corresponding record is stored.

2. The database system of claim 1 wherein the second database includes a plurality of directories in which said records of said second database are stored, said directories being named based on at least a first type of call detail data contained in the records of said second database, and
  wherein said at least one piece of call detail data is used in said retrieving as at least a portion of the directory name in which said corresponding record is stored in said second database.

3. The database system of claim 2 wherein each said directory is named based on a date when the records in that directory were stored and wherein said at least one piece of call detail data is the date on which said corresponding record was stored in said second database.

4. The database system of claim 1 wherein the second database includes a plurality of files in which the records of said second database are stored, said files being named based on at least a first type of call detail data contained in the records of said second database,
  wherein each of files includes a plurality of said records of said second database, and
  wherein said at least one piece of call detail data is used in said retrieving as at least a portion of the file name in which said corresponding record is stored in said second database.

5. The database system of claim 4 wherein each said file is named based on at least one of a) a telecommunications switch from which the calls whose records are stored in that file originated and b) an hour representing an approximate time when the records were stored in that file, and
  wherein said at least one piece of call detail data is at least one of a) a telecommunications switch from which the call associated with said corresponding record originated and b) an hour representing an approximate time when said corresponding record was stored in said second database.

6. The database system of claim 1 wherein each record in the second database is stored in a file and the file is stored in a directory, and
  wherein the directory is named based on at least a first type of the call detail data contained in the records of said second database and wherein the file is named based on at least a second type of the call detail data contained in the records of said second database.

7. The database system of claim 1
wherein the second database comprises a plurality of files each of which contains a plurality of said records stored in said second database, and
wherein the records in said second database are compressed at a higher level than at the individual record level.

8. The database system of claim 1
wherein the second database comprises a plurality of files each of which contains a plurality of said records stored in said second database, and
wherein the records in said second database are compressed at the file level.

9. The database system of claim 1 wherein said second database includes no explicit indexing.

10. The database system of claim 1 wherein the records in the first database contain information about the difference between a first time when the call was completed and a second time when the completed call detail data was processed in the second database.

11. The database system of claim 1 wherein said retrieving said corresponding record from the second database is performed in response to a user performing a "point-and-click" on the record retrieved from the first database.

12. A method of retrieving call detail data about a call, the method comprising:
querying a first database with a first query, wherein the first query includes one or more characteristics of the call detail data and wherein the first database includes interpreted usage events (IUEs), each IUE including a portion of the call detail data and each IUE being stored in a record having a fixed number of fields, each field having a fixed format, at least some of the fields storing characteristics of the call detail data;
retrieving from the first database the IUE responsive to the first query, wherein the retrieving the IUE is executed in a quick manner based on characteristics of the first database;
querying a second database with a second query, wherein the second query includes characteristics from the retrieved IUE, wherein the second database stores the call detail data in a record, wherein said second database includes a plurality of records and wherein each different IUE in said first database corresponds to a different record in the second database; and
retrieving the record from the second database responsive to the second query,
wherein:
wherein retrieving of the record from the second database is performed quickly based on characteristics of the second database and characteristics from the retrieved IUE, and
the characteristics of the first database include one or more of the fields being indexed and wherein the characteristics of the second database include no explicit indexing.

13. The database system of claim 12
wherein the second database includes a plurality of directories in which said records of said second database are stored, said directories being named based on at least a first type of call detail data contained in the records of said second database, and
wherein said characteristics from the retrieved IUE are used, in said retrieving the corresponding record from the second database, as at least a portion of the directory name in which the corresponding record is stored in said second database.

14. The database system of claim 13 wherein each said directory is named based on a date when the records in that directory were stored and wherein said characteristics from the retrieved IUE include the date on which said corresponding record was stored in said second database.

15. The database system of claim 12
wherein the second database includes a plurality of files in which the records of said second database are stored, said files being named based on at least a first type of call detail data contained in the records of said second database,
wherein each of files includes a plurality of said records of said second database, and
wherein said characteristics from the retrieved IUE are used, in said retrieving the corresponding record from the second database, as at least a portion of the file name in which the corresponding record is stored in said second database.

16. The database system of claim 15 wherein each said file is named based on at least one of a) a telecommunications switch from which the calls whose records are stored in that file originated and b) an hour representing an approximate time when the records were stored in that file, and
wherein said characteristics from the retrieved IUE include at least one of a) a telecommunications switch from which the call associated with said corresponding record originated and b) an hour representing an approximate time when said corresponding record was stored in said second database.

17. The database system of claim 12
wherein each record in the second database is stored in a file and the file is stored in a directory, and
wherein the directory is named based on at least a first type of the call detail data contained in the records of said second database and wherein the file is named based on at least a second type of the call detail data contained in the records of said second database.

18. The database system of claim 12
wherein the second database comprises a plurality of files each of which contains a plurality of said records stored in said second database, and
wherein the records in said second database are compressed at a higher level than at the individual record level.

19. The database system of claim 12
wherein the second database comprises a plurality of files each of which contains a plurality of said records stored in said second database, and
wherein the records in said second database are compressed at the file level.

20. The database system of claim 12 wherein the records in the first database contain information about the difference between a first time when the call was completed and a second time when the completed call detail data was processed in the second database.

21. The database system of claim 12 wherein said retrieving the corresponding record from the second database is performed in response to a user performing a "point-and-click" on the record retrieved from the first database.

* * * * *